G. W. MILLER.
DIFFERENTIAL LOCK.
APPLICATION FILED JUNE 27, 1914.

1,142,831.

Patented June 15, 1915.

WITNESSES

INVENTOR
George W. Miller
by Edward A. Laurence
his attorney.

UNITED STATES PATENT OFFICE.

GEORGE W. MILLER, OF TARENTUM BOROUGH, PENNSYLVANIA.

DIFFERENTIAL LOCK.

1,142,831.  Specification of Letters Patent.  Patented June 15, 1915.

Application filed June 27, 1914. Serial No. 847,565.

*To all whom it may concern:*

Be it known that I, GEORGE W. MILLER, a citizen of the United States, and residing in the borough of Tarentum, in the county of Allegheny and State of Pennsylvania, have invented or discovered new and useful Improvements in Differential Locks, of which the following is a specification.

My invention comprises a differential lock for automobiles and other power-driven vehicles.

Where either semi-floating or full floating driving axles are used, the breakage of one of the axles renders the differential inoperative to drive the other axle and the broken axle must be replaced before the vehicle can travel under its own power. This is a very frequent cause of delay and inconvenience. Also where one of the vehicle driving wheels sinks into a mud hole, when power is applied this wheel spins and little or no rotative power is applied to the other driving wheel so that the vehicle must be dragged or pried out of the difficulty. Again on a slippery or laterally inclined road surface, one wheel may be running faster than the other wheel, resulting in lateral skidding.

The object of my invention is to overcome these difficulties, which object I effect by providing means whereby, when necessary, the two driving axles may be locked together or to a common member whereby said axles may be rotated in unison.

Figure 1:
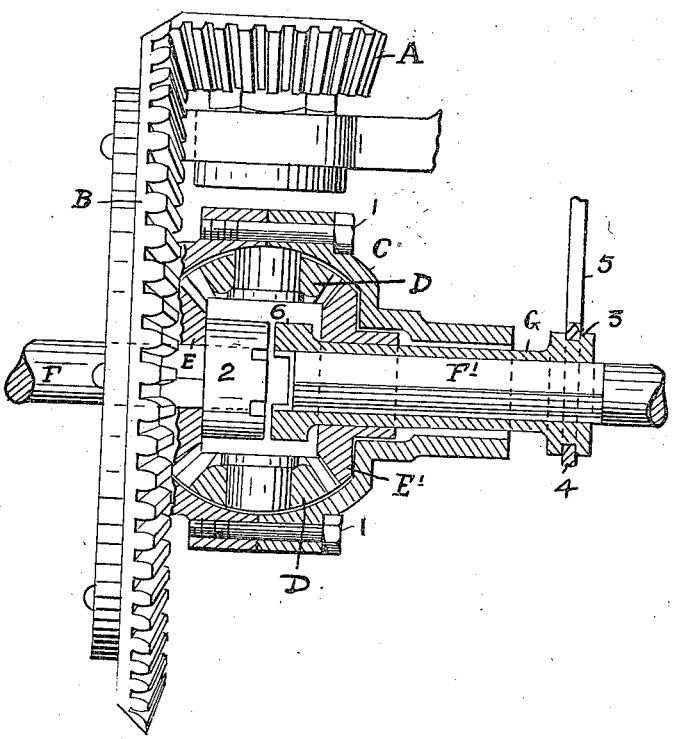
Figure 2:
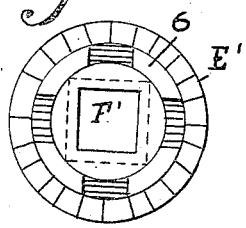
Figure 3:
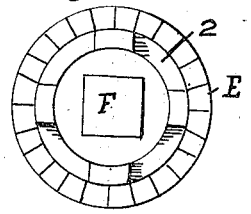

In the accompanying drawings, which are intended merely to illustrate the principles of my invention and not to limit the scope of the same to the construction shown, Figure 1 is a top plan view of a floating axle differential, shown partly in section, having my invention applied thereto; Fig. 2 is a view of the inner end of the right hand axle in Fig. 1, and Fig. 3 is a similar view of the left hand axle.

The following is a detailed description of the drawings.

A represents a pinion mounted on the end of the driving shaft, not shown, and beveled to mesh with the large beveled gear B on the face of which is mounted the casing C preferably made in two parts held together as by the bolts 1.

D are the usual driving pinions mounted radially in the casing C and meshing with the beveled gears E and E' of the driving axles F and F'. The axial bore of the gear E is squared to receive the inner squared end of the axle F which extends freely through the axial opening of the large gear B. The inner face of the gear E is provided with a clutch member 2. The square axial bore of the gear E' is enlarged so that the squared sleeve G may freely slide therein, said sleeve having in turn a squared bore to receive the squared end of the axle F'. The outer end of the sleeve G extends without the casing and is there provided with a circumferential yoke groove 3 to receive the yoke 4 of the operating lever 5. The inner end of the sleeve G is provided with a clutch member 6 which is adapted to engage the clutch member 2 when the sleeve G is slid inwardly toward the gear E.

It is evident that by moving the sleeve inwardly, so that the clutch members 2 and 6 interlock, the two axles F and F' are locked together and will be rotated in unison, so that where one of the axles is broken, rotation may be imparted to the sound axle to propel the car; or where one of the wheels tends to spin in a mud hole, both wheels may be forced to rotate at the same rate, or where a slippery or laterally sloping road surface is encountered, lateral skidding may be avoided or checked.

It is evident from the foregoing that a large proportion of the accidents and delays attending the operation of power-driven vehicles may be avoided by the use of my invention.

What I desire to claim is:—

1. In a differential for a vehicle, the combination of a power-driven rotary casing, a pair of opposing beveled gears in said casing spaced a fixed distance apart, beveled driving pinions mounted radially in said casing and interposed between said gears to constantly mesh with both of the latter, a pair of floating shafts having their inner ends inserted into the bores of said beveled gears and rotating in unison therewith, a fixed clutch member mounted on the inner end of one of said shafts, a sliding clutch member, movable longitudinally independent of its shaft and the corresponding beveled gear, mounted on the inner end of the other shaft, and means without said casing for moving said sliding clutch member into engagement with said fixed clutch member, whereby said shafts are locked together, for the purpose described.

2. In a differential for a vehicle, the combination of a power-driven rotary casing, a pair of opposing beveled gears in said casing, beveled driving pinions mounted radially in said casing and interposed between said gears to constantly mesh with both of the latter, a driven shaft having its inner end inserted in the bore of one of said gears and rotating therewith, a clutch member rigidly mounted on the inner end of said shaft, a clutch member inserted in the bore of the other gear to slide therein and rotate therewith, a second driven shaft having its inner end inserted in said second clutch member and rotating therewith, and means without said casing for moving said second clutch member at will into engagement with said first clutch member whereby said shafts may be locked together to rotate in unison, for the purposes described.

Signed at Pittsburgh, Penna., this 19th day of June, 1914.

GEORGE W. MILLER.

Witnesses:
    EDWARD A. LAWRENCE,
    JOHN McKELVIE.